United States Patent [19]
Higuchi et al.

[11] Patent Number: 5,610,721
[45] Date of Patent: Mar. 11, 1997

[54] IMAGE FORMING APPARATUS FOR FORMING AN IMAGE IN SYNCHRONIZATION WITH A VERTICAL SYNCHRONIZING SIGNAL

[75] Inventors: Kaoru Higuchi; Hiroshi Ishii; Masaya Nagata, all of Nara, Japan

[73] Assignee: Sharp Kabushiki Kaisha, Osaka, Japan

[21] Appl. No.: 494,625

[22] Filed: Jun. 23, 1995

[30] Foreign Application Priority Data

Jul. 6, 1994 [JP] Japan ................. 6-154612

[51] Int. Cl.$^6$ ..................... H04N 1/21; H04N 1/36
[52] U.S. Cl. ..................... 358/396; 358/409; 358/410; 358/412
[58] Field of Search ..................... 358/296, 410, 358/409, 412, 498; 346/108

[56] References Cited

U.S. PATENT DOCUMENTS

| | | | |
|---|---|---|---|
| 3,665,099 | 5/1972 | Emmons | 358/409 X |
| 5,321,486 | 6/1994 | Nanbu et al. | 355/311 |
| 5,331,341 | 7/1994 | Egawa et al. | 346/108 |
| 5,412,480 | 5/1995 | Serizawa et al. | 358/296 |
| 5,457,487 | 10/1995 | Sakaki et al. | 347/116 |
| 5,481,656 | 1/1996 | Wakabayashi et al. | 395/115 |

*Primary Examiner*—Peter S. Wong
*Assistant Examiner*—K. Shin

[57] ABSTRACT

In response to a vertical synchronizing signal generated from a vertical synchronizing signal generator, a microcomputer forms a predetermined image on a print sheet using a printer head on the basis of image data applied from an image memory. The microcomputer controls the rotation of a motor so that the move position of the print sheet is set to a predetermined position with a vertical synchronizing signal as the reference after an edge of the print sheet is detected by a sheet sensor.

26 Claims, 7 Drawing Sheets

IMAGE FORMING APPARATUS FOR FORMING AN IMAGE IN SYNCHRONIZATION WITH A VERTICAL SYNCHRONIZING SIGNAL

BACKGROUND OF THE INVENTION

1. Field of the Invention

The present invention relates to an image forming apparatus that moves a print sheet in response to a vertical synchronizing signal for forming a predetermined image, for example, a color video printer printing out an image in synchronization with a vertical synchronizing signal of a video signal.

2. Description of the Background Art

A conventional color video printer will be described hereinafter as a typical image forming apparatus. A color video printer stores desired image data applied by an input device such as a video deck into an image memory. The image data is transferred to a monitor output from the image memory in synchronization with a vertical synchronizing signal of a video signal. A printing operation is carried out by transferring image data from the image memory to a printing unit. The transfer timing of image data in a printing operation includes the method of using the output of a vertical synchronizing signal and the method of detecting the leading edge of a sheet with a sensor during transportation of a sheet. These two methods will be described in detail hereinafter.

The first method using an output of a vertical synchronizing signal will be described with reference to the block diagram of FIG. 11 showing the structure of a system including a conventional video printer.

Referring to FIG. 11, the system includes an input device 30, a video printer 20, and a monitor 31. Input device 30 provides image data to video printer 20. Video printer 20 provides the image data as a monitor output signal to monitor 31 in synchronization with a vertical synchronizing signal.

Video printer 20 includes an image memory 21, a printer unit 23, and a sheet convey unit 24.

Image data provided from input device 30 is input to image memory 21 to be stored therein. Image memory 21 provides image data to sheet convey unit 24, printer unit 23 and monitor 31 in synchronization with a vertical synchronizing signal. Sheet convey unit 24 responds to an input vertical synchronizing signal to convey a print sheet. Printer unit 23 responds to an input vertical synchronizing signal to print one line of data out of the input image data sequentially onto a print sheet. Sheet convey unit 24 is subject to an open loop control using a stepping motor that facilitates positioning since the start position for printing must be adjusted.

The second method carried out by detecting the leading edge of a sheet during transportation thereof will be described with reference to the block diagram of FIG. 12. Referring to FIG. 12, a system including a conventional video printer includes an input device 30, a video printer 20a, and a monitor 31. The operations of input device 30 and monitor 31 are similar to those of FIG. 11.

Video printer 20a includes an image memory 21a, a sheet sensor 22, and a printer unit 23. Image memory 21a stores image data provided from input device 30. Image memory 21a provides the stored image data to monitor 31. Sheet sensor 22 provides a sheet edge detection signal to image memory 21a when one edge of a print sheet to be transported is detected. Image memory 21a responds to a sheet edge detection signal to move the image data to printer unit 23. Printer unit 23 forms a predetermined image on a print sheet according to the transferred image data. Here, control of the start position of printing is not required, and transportation of a print sheet is carried out using a stepping motor, a DC motor, and the like.

The above-described method using an output of a vertical synchronizing signal for the transfer timing of image data is disadvantageous over the case where a DC motor is used since the employed stepping motor is bulky with inferior efficiency of the motor itself. The usage of a stepping motor was a bottleneck to reduction in the size and power consumption of the apparatus.

In the above-described second method, a transfer path to printer unit 23 must be provided in addition to the monitor output in the transfer system of image memory 20. This increases the circuit complexity, as well as the image data transfer control complexity. The transfer rate and processing rate of image data depend upon the ability of image memory 21a, so that it was difficult to realize a highly functional video printer.

In order to circumvent these difficulties, research efforts have been made to control the image data transfer timing using a vertical synchronizing signal. However, a sheet edge detection signal provided from a sensor detecting one edge of a print sheet and a vertical synchronizing signal are independent of each other. Furthermore, a color video printer employs the method of reproducing color image information generally with 3 colors superimposed. These two facts yield a problem set forth in the following. FIG. 13 is a timing chart for describing the problem of a conventional video printer. Referring to FIG. 13, the time from a rise of a sheet edge detection signal to an input of a vertical synchronizing signal is $\Delta t1$, $\Delta t2$, and $\Delta t3$ for the first color, second color, and the third color, respectively. The term from the rise of a sheet edge detection signal to an input of a vertical synchronizing signal differs for each color. This difference leads to deviation in the printing position, resulting in offset in color registration. Such a deviation in the printing position was as great as a shift corresponding to 1 period of a vertical synchronizing signal at the maximum. It was therefore difficult to reproduce a color image in good registration. Furthermore, the structure of the control circuit becomes more complicated if the above process is to be carried out. There was the problem that the sheet transportation control operation is difficult and unstable.

SUMMARY OF THE INVENTION

An object of the present invention is to provide an image forming apparatus eliminating deviation in the print start position for forming an image of high quality with no offset in color registration.

Another object of the present invention is to provide an image forming apparatus in which the time required to obtain synchronization is short and its control operation stable.

An image forming apparatus according to an aspect of the present invention responds to a vertical synchronizing signal to move a print sheet and forms a predetermined image. The image forming apparatus includes a convey unit for moving a print sheet, an image forming unit for forming a predetermined image on a print sheet while the print sheet is being shifted by the convey unit, a detector for detecting an edge of the print sheet, and a control unit for controlling the convey unit so that the position of the print sheet is located at a predetermined position with the vertical synchronizing signal as the reference after one edge of the print sheet is detected by the detector in moving the print sheet by the convey unit.

According to the above structure, the control unit controls the convey unit so that the moved position of the print sheet is located at a predetermined position with the vertical synchronizing signal as the reference following detection of an edge of the print sheet by the detector in moving the print sheet. The print sheet can be conveyed to a predetermined position after one edge of the print sheet is detected with respect to a vertical synchronizing signal. Therefore, the position of the print sheet with respect to a vertical synchronizing signal can be controlled at high accuracy.

There is no deviation in the print starting position, and an image of high quality with no offset in color registration can be formed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
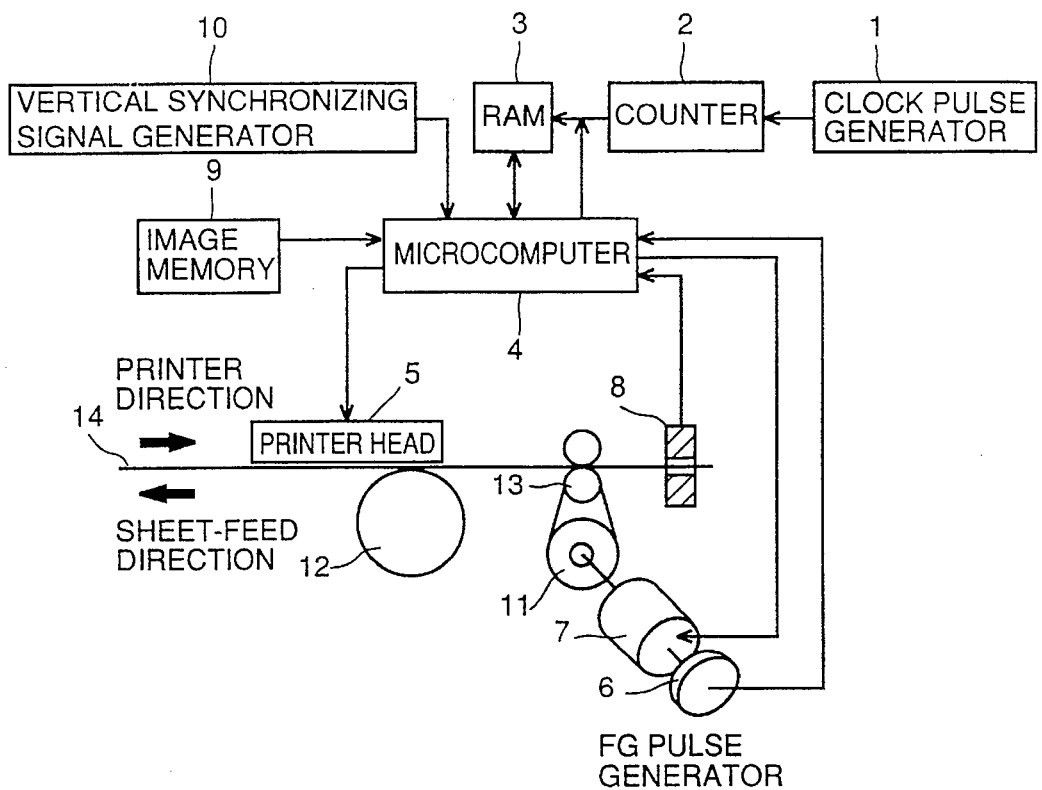
FIG. 1 is a block diagram showing a structure of an image forming apparatus according to an embodiment of the present invention.

Referring to FIG. 1, an image forming apparatus includes a clock pulse generator 1, a counter 2, an RAM (Random Access Memory) 3, a microcomputer 4, a printer head 5, an FG pulse generator 6, a motor 7, a sheet sensor 8, an image memory 9, a vertical synchronizing signal generator 10, a transmission gear 11, a platen roller 12, and a grid roller 13.

Clock pulse generator 1 generates a clock pulse of a predetermined frequency for determining the minimum time reference of operation regardless of the operation of each component. The generated clock pulse is applied to counter 2. Clock pulse generator 1 includes, for example, a crystal oscillator. Counter 2 carries out addition or subtraction within a predetermined time to count the number of input clock pulse. Counter 2 can hold the previous count value, and sequentially update the stored count value. The count value of counter 2 is stored in RAM 3 in response to a control signal of microcomputer 4. The memory region of RAM 3 is divided into a plurality of regions to store a plurality of values. Microcomputer 4 reads out a count value stored in RAM 3, and also provides predetermined data thereto. Vertical synchronizing signal generator 10 provides a vertical synchronizing signal of a predetermined frequency to microcomputer 4. Upon detecting the edge of print sheet 14, sheet sensor 8 provides a sheet edge detection signal to microcomputer 4. Sheet sensor 8 includes an optical sensor such as a transmitting type or reflective type photosensor. FG pulse generator 6 responds to the rotation of a motor 7 such as a DC motor to generate a predetermined number of pulses per rotation. The generated pulse is provided to microcomputer 4. FG pulse generator 6 includes, for example, an AC tacho-generator, a frequency generator (FG), a magnetic/optical shaft encoder, or the like. Microcomputer 4 controls the rotation operation of motor 7 according to the above signals. Transmission gear 11 is attached to motor 7. Transmission gear 11 rotates grid roller 13 via a timing belt. Grid roller 13 responds to the rotation of motor 7 to convey print sheet 14 in the printer direction or the sheet-feed direction. Image memory 9 provides predetermined image data to be printed to microcomputer 4. Microcomputer 4 provides the input image data to printer head 5. Printer head 5 prints out a predetermined image on print sheet 14 according to the input image data while print sheet 14 is being shifted in the printing direction.

Upon detecting the leading edge of print sheet 14 by sheet sensor 8, microcomputer 4 conveys the sheet to a print start position with a predetermined amount, for example with a margin, on the basis of a sheet edge detection signal which is the detection signal from sheet sensor 8. When the sheet is moved to the print starting position, microcomputer 4 stops motor 7 to carry out a sheet-feed supply operation. Then, microcomputer 4 responds to a predetermined print signal to convey print sheet 14 towards the printer direction. Microcomputer 4 controls the position based upon the pulse provided from FG pulse generator 6 so that the leading edge of print sheet 14 is in synchronization with the output position of a vertical synchronizing signal which will be described in details afterwards. There will be no offset in color registration since a relevant color will always be printed on the same position even in the case where a plurality of colors are to be printed to form a color image. Therefore, a color image of high quality can be provided.

The control of sheet convey by microcomputer 4 will be described in detail with reference to the block diagram of FIG. 2.

Figure 2:
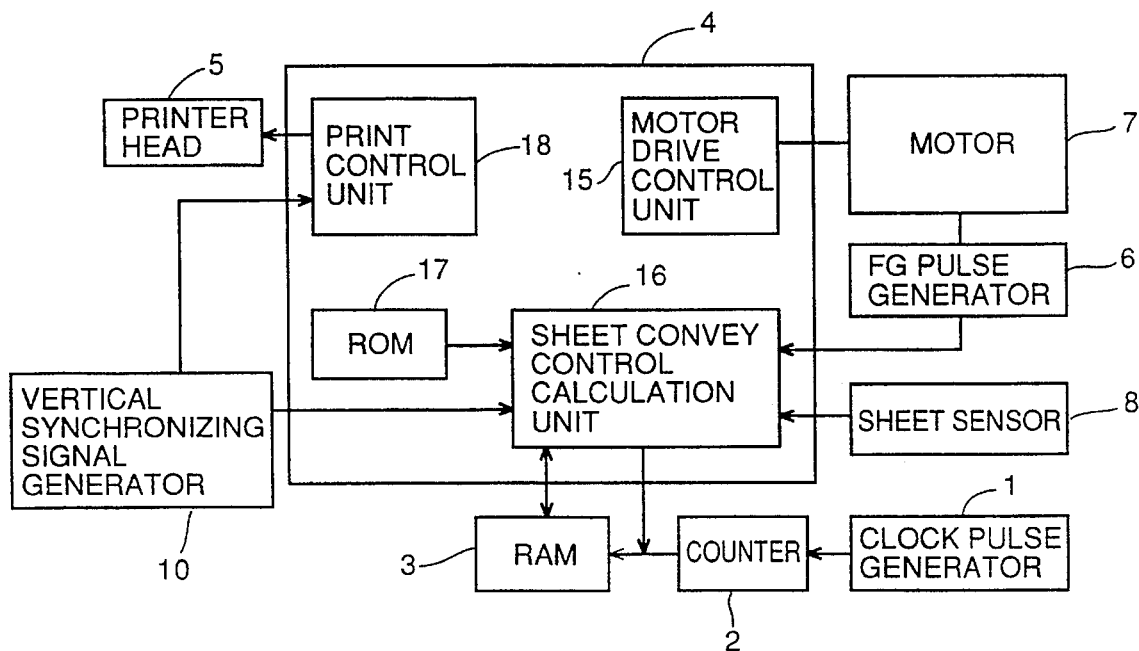
FIG. 2 is a block diagram showing the functions of a sheet convey control unit of the image forming apparatus of FIG. 1.

Referring to FIG. 2, the sheet convey control unit of the image forming apparatus includes a microcomputer 4, a printer head 5, a vertical synchronization signal generator 10, an RAM 3, a counter 2, a clock pulse generator 1, a sheet sensor 8, an FG pulse generator 6, and a motor 7. Microcomputer 4 includes a motor drive control unit 15, a sheet convey control calculation unit 16, an ROM (Read Only Memory) 17, and a print control unit 18.

Vertical synchronizing signal generator 10 provides a vertical synchronizing signal to print control unit 18 and sheet convey control calculation unit 16. Print control unit 18 responds to an input vertical synchronizing signal to control printer head 5 to form a predetermined image at a predetermined timing. The rotation of motor 7 is detected by FG pulse generator 6. An FG pulse according to the rotation of motor 7 is provided to sheet convey control calculation unit 16. Sheet sensor 8 provides a sheet edge detection signal to sheet convey control calculation unit 16 when the leading edge of a print sheet is detected. Clock pulse generator 1 provides a clock pulse of a predetermined period to counter 2. Counter 2 stores the count value of the clock pulse into RAM 3 according to an instruction from sheet convey control calculation unit 16. The amount of position control and velocity control which will be described afterwards are calculated on the basis of this count value. Sheet convey control calculation unit 16 reads out a count value stored in RAM 3, and also stores predetermined data thereto. Data of velocity gains $G_{V0}$, $G_{V1}$, position gain $G_{P1}$, the target amount of travel, target velocity value, and the like are stored in advance as design values. Sheet convey control calculation unit 16 reads out predetermined data from ROM 17 if necessary to carry out a control operation. Sheet convey control calculation unit 16 provides the calculated velocity coefficient and position coefficient calculated on the basis of each input data to motor drive control unit 15. Motor drive control unit 15 responds to each input coefficient to rotate motor 7 accordingly.

The operation of the sheet convey control unit of the image forming apparatus of the above structure will be described in detail hereinafter.

Figure 3:
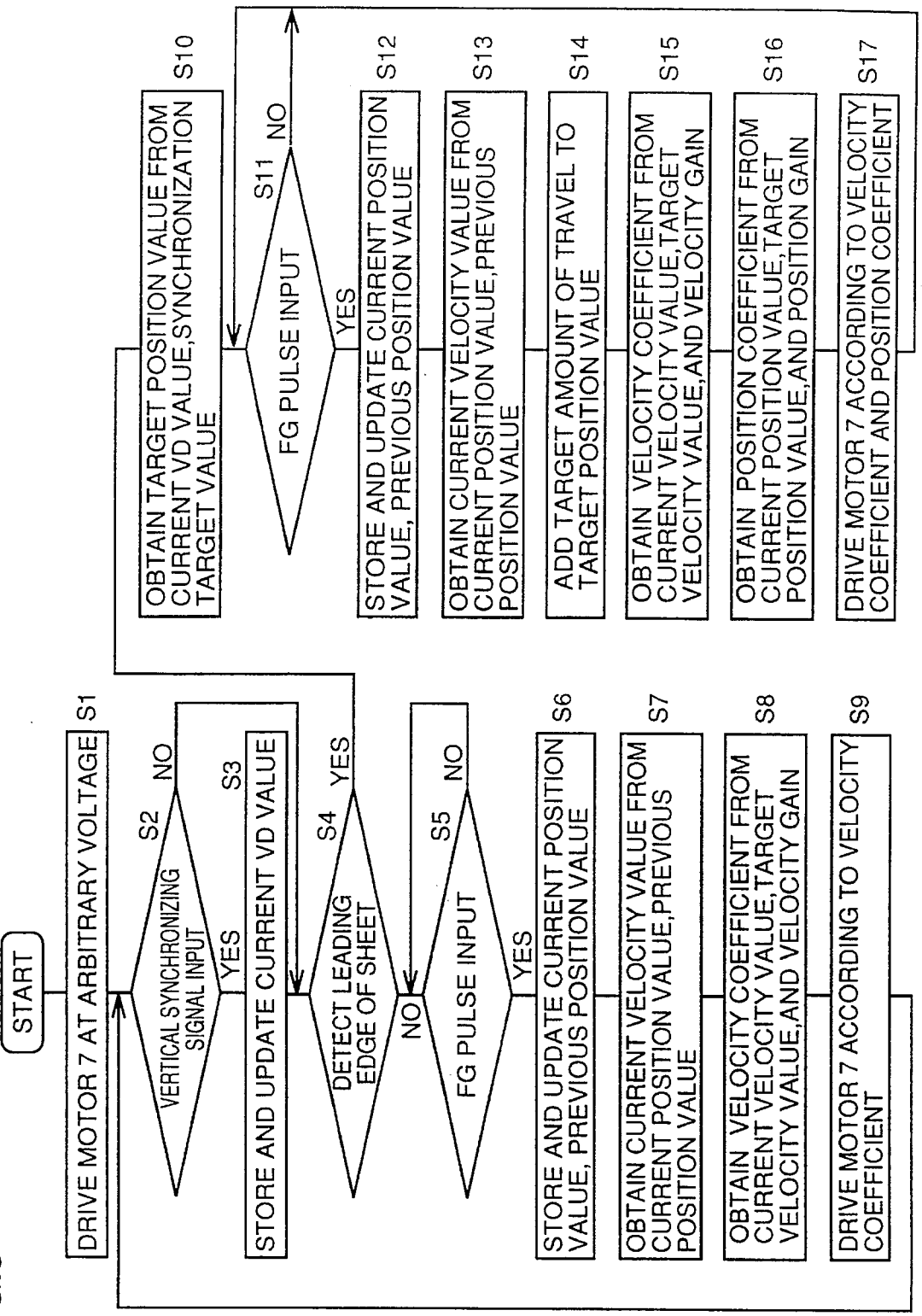
FIG. 3 is a flow chart for describing the operation of the sheet convey control unit of the image forming apparatus of FIG. 2.

Referring to the flow chart of FIG. 3, motor drive control unit 15 applies a predetermined drive voltage to motor 7 according to a print signal at step S1, whereby a sheet convey operation is initiated by the rotation of motor 7.

At step S2, sheet convey control calculation unit 16 verifies whether a vertical synchronizing signal is input or not. When a vertical synchronizing signal is input, the control proceeds to step S3, otherwise to step S4.

At step S3, sheet convey control calculation unit 16 stores the count value of counter 2 as the current value of VD (vertical synchronizing signal) into RAM 3, and updates the data.

At step S4, sheet convey control calculation unit 16 verifies whether a sheet edge detection signal is input from sheet sensor 8. When a sheet edge detection signal is input, the control proceeds to step S10, otherwise to Step S5.

At step S5, sheet convey control calculation unit 16 verifies whether an FG pulse is input or not. When an FG pulse is not input, step S5 is repeated, otherwise the control proceeds to step S6.

At step S6, sheet convey control calculation unit 16 reads out the current position value from RAM 3, and stores the read out current position value as the previous position value into RAM 3. The count value of counter 2 is stored in RAM 3 as the current position value. The previous position value when the first FG pulse is input upon initiation of a sheet convey operation is 0.

At step S7, sheet convey control calculation unit 16 reads out the previous position value and the current position value from RAM 3. The current velocity value is calculated by subtracting the previous position value from the current position value. This calculated current velocity value is stored in RAM 3. By comparing the current velocity value with the target velocity value, the sheet convey velocity can be determined. More specifically, when the current velocity value (the number of clock pulses within 1 period of an FG pulse) is greater than the target velocity value (i.e. when the period of FG is longer than the target period), the sheet convey velocity is slower than the target velocity. If the target velocity value is greater than the current velocity value, the sheet convey velocity is faster than the target velocity.

At step S8, sheet convey control calculation unit 16 reads out the current velocity value from RAM 3, and the target velocity value and velocity gain $G_{V0}$ from ROM 17. Sheet convey control calculation unit 16 multiplies velocity gain $G_{V0}$ by the value having the target velocity value subtracted from the current velocity value. The multiplied result is stored into RAM 3 as the velocity coefficient.

At step S9, sheet convey control calculation unit 16 reads out the velocity coefficient from RAM 3, and provides a signal according to the read out velocity coefficient to motor drive control unit 15. Then the control returns to step S2.

According to the above operation, velocity control is carried out so that the rotation velocity of motor 7 is equal to the target velocity value, whereby print sheet 14 is conveyed.

When a sheet edge detection signal is detected at step S4, the control proceeds to step S10 where sheet convey control calculation unit 16 reads out the current VD value from RAM 3, and the synchronization target value from RAM 17. Sheet convey control calculation unit 16 adds the current VD value and the synchronization target value, which is then stored into RAM 3 as the target position value.

At step S11, sheet convey control calculation unit 16 verifies whether an FG pulse is input or not. When an FG pulse is input, the control proceeds to step S12, otherwise step S11 is repeated.

When an FG pulse is input at step S11, the control proceeds to step S12 where sheet convey control calculation unit 16 reads out the current position value from RAM 3, which is stored back again into RAM 3 as the previous position value. Sheet convey control calculation unit 16 stores the count value of counter 2 as the current position value.

At step S13, sheet convey control calculation unit 16 reads out the previous position value and the current position value from RAM 3. Sheet convey control calculation unit 16 calculates the current velocity value by subtracting the previous position value from the current position value. The calculated current velocity value is stored into RAM 3.

At step S14, sheet convey control calculation unit 16 reads out the target position value from RAM 3 and the target amount of travel from ROM 17. The target amount of travel is added to the target position value to be stored into RAM 3 as the target position value.

At step S15, sheet convey control calculation unit 16 reads out the current velocity value from RAM 3, and the target velocity value and velocity gain $G_{V1}$ from ROM 17. Sheet convey control calculation unit 16 subtracts the target velocity value from the current velocity value and stores this value as velocity deviation into RAM 3. Sheet convey control calculation unit 16 also multiplies the calculated velocity deviation by velocity gain $G_{V1}$, which is then stored into RAM 3 as the velocity coefficient.

At step S16, sheet convey control calculation unit 16 reads out the target position value and the current position value from RAM 3, and position gain $G_{P1}$ from ROM 17. Sheet convey control calculation unit 16 subtracts the current position value from the target position value, which is then stored into RAM 3 as position deviation. The calculated position deviation is multiplied by position gain $G_{P1}$ to be stored into RAM 3 as the position coefficient.

At step S17, sheet convey control calculation unit 16 reads out the velocity coefficient and the position coefficient from RAM 3, which are added. A signal according to this added value is provided to motor drive control unit 15. Then, the control returns to S11.

According to the above operation, the leading edge of a print sheet is detected, whereby the position and velocity of the print sheet is controlled. Stable control is provided so that the print sheet is located at a predetermined position with a vertical synchronizing signal as the reference.

Figure 4:
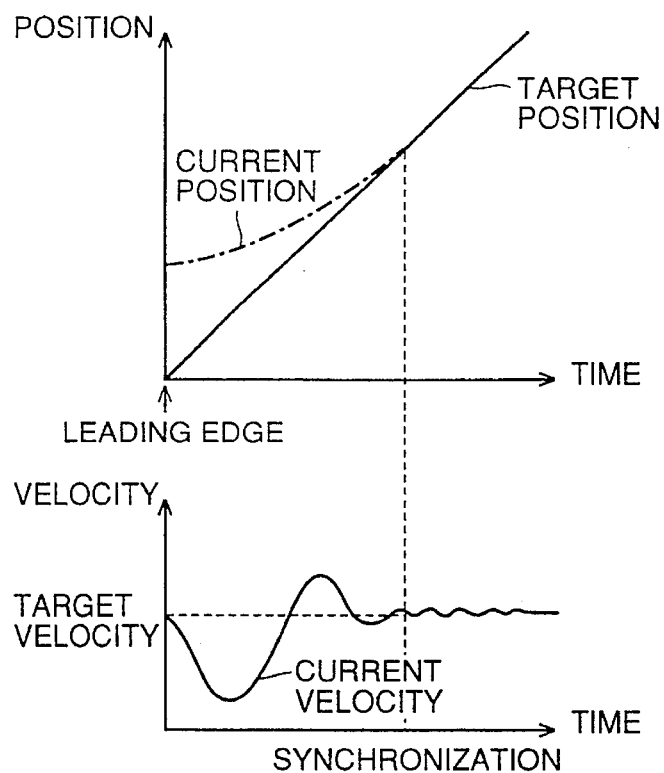
FIG. 4 shows the relationship between the current position with respect to a target position and the current velocity with respect to the target velocity.

The control result according to the above-described control operation will be described with reference to FIG. 4. Referring to FIG. 4, there is a great difference between the current position and the target position when the leading edge of a sheet is detected. However, the current position exactly coincides with the target position at the time of synchronization. It is appreciated that the position of the print sheet is constantly controlled with respect to a vertical synchronizing signal thereafter. As to the velocity, it is appreciated that the current velocity is varied in order to conform to the current position until the time of synchronization. However, the current velocity coincides with the target velocity after synchronization. According to the image forming apparatus of FIG. 1, the current position can easily be made to synchronize with the target position. A predetermined image can be formed at the same position even when a plurality of times of printing operations are carried out in different colors. Therefore, offset in color registration can be prevented.

The timing of the actual start of printing (when a current corresponding to image data is provided to printer head 5) is established as set forth in the following. When the absolute value of the position deviation at the time the leading edge of a print sheet 14 is detected is greatest, 2 is added to a value which is the time required for synchronization divided by the period of a vertical synchronizing signal. The added value is the VD count value. When the number of input vertical synchronizing signals after detection of the leading edge of print sheet 14 reaches the VD count value, printer control unit 18 transfers image data to printer head 5, whereby printer head 5 initiates a printing operation. Upon completion of printing of the first color, print sheet 14 is transferred in the sheet-feed direction, and the above-described process is repeated for the number of color components to be printed out.

According to the above process, the detection position of the leading edge of print sheet 11 is made to match the synchronization target value in the printing operation of each color. Therefore, deviation in the print start position is eliminated to allow printing of high quality.

Figure 5:
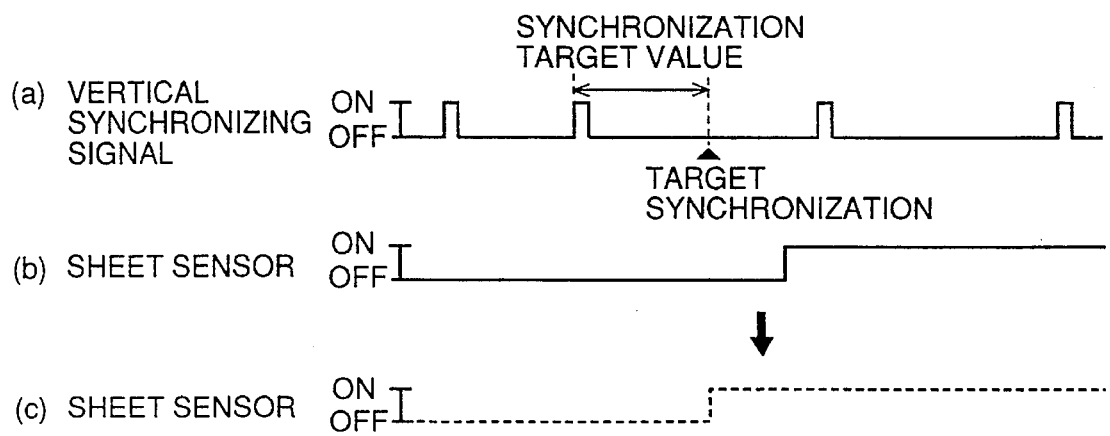
FIG. 5 is a timing chart for describing the concept of synchronization in a control operation.

FIG. 5 is a timing chart for describing the concept of synchronization of the above control operation. A predetermined synchronization target value is set based upon a rise of a vertical synchronizing signal as shown in (a). The position of print sheet 14 is controlled by the above operation even if the actual sheet edge detection signal output from sheet sensor 8 is detected offset from the target synchronizing value as shown in (b), so that the sheet edge detection signal output from sheet sensor 8 will be detected at a timing identical to that of the synchronization target value as shown in (c).

The above control operation will be described in further detail with actual numeric values. For example, the period of a vertical synchronizing signal is set to 1/30 seconds, and printing of one line is carried out for every one period. The frequency of the clock pulse generated by clock pulse generator 1 is 3 MHz, and the resolution in the sheet convey direction (vertical resolution) is 6 dot/mm. The amount of travel of a sheet is 1/12 mm by one rotation of motor 7, and the number of pulses of FG pulse generator 6 per rotation is 20 pulses.

According to the above conditions, motor 7 rotates two times (=1/6[mm/dot]÷1/12[mm/rev]) to print out 1 line of an image, and the frequency of the FG pulse is 1200 Hz (=20[pulse/rev]×2[rev]÷1/30[sec]). Therefore, the target velocity value takes the count value of 2500 (=3000000[Hz] ÷1200[Hz]). Also, the number of FG pulses generated during 1 period of a vertical synchronizing signal is 40 (=20[pulse/rev]×2[rev]), and the number of clock pulses is 100000 (=3000000[pulse/sec]×1/30[sec]).

When, for example, the synchronization target value is set to the count value of 40000 and the current VD value of a vertical synchronizing signal right before detecting the leading edge of print sheet 14 is 1500, and the target position value is the count value of 41500. When the current position value by the FG pulses right before the leading edge of print sheet 14 is detected is 22000, and the current position value right after the detection is 25000, the current velocity value after detecting the leading edge of print sheet 14 becomes 3000 (=25000−22000). The target position value is 44000 (=41500+2500) when the target capacity is equal to the target velocity.

By calculating each deviation on the basis of the above values, the velocity deviation and the position deviation take the count values of 500 (=3000−2500) and −19000 (=25000−44000), respectively. Assuming that the velocity gain is $G_{V1}$ and the position gain is $G_{P1}$, the velocity coefficient is 500×$G_{V1}$ and the position coefficient is −1900× $G_{P1}$. The calculated velocity coefficient and position coefficient are added. A signal according to this added value is provided to motor drive control unit 15 as an output value to motor 7 to carry out the above sheet convey control.

Although the above sheet convey control before detection of the leading edge of print sheet 14 is described on the basis of only velocity control, the control before and after detection of the leading edge may not have to be carried out separately. A PLL (Phase Lock Loop) control including phase control identical to that following input of a vertical synchronizing signal may be employed. Furthermore, since the sheet convey control during printing is carried out by a constant velocity, the target amount of travel may be the target velocity value. It is to be noted that the calculation method of the velocity and position coefficients and calculation of printsstart position are not limited to those described above.

In the above embodiment, the synchronization target value is set to 40000. Printing can be initiated more quickly by reducing the time required for synchronization by setting the target position of synchronization in the middle of the vertical synchronizing signals right before and right after detection of the leading edge of print sheet 14. More specifically, the total number of clock pulses generated within one period of a vertical synchronizing signal is divided by 2. This divided value is rounded up or rounded off to be used as the synchronization target value in the above-described sheet convey control.

In the above control operation, the current position value when the leading edge of print sheet 14 is detected is within the range of the current VD value of the vertical synchronizing signal right before detection of the leading edge and the current VD value of the vertical synchronizing signal right after the detection of the leading edge. The maximum of the absolute value of the difference between the current position value and the target position value (maximum position deviation) is the difference between the current VD value right after or right before detection of the leading edge and the target position value. By setting the intermediate of the immediate preceding and immediate succeeding current VD values when the leading edge of print sheet 14 is detected, the maximum position deviation can be minimized. More specifically, by setting the synchronization target value to half the value of subtracting the immediate preceding current VD value from the immediate succeeding current VD value, the maximum position deviation can be made minimum.

The above will be described more specifically with numeric values. When the synchronization target value is 40000 pulses, the maximum position deviation is 60000 pulses (=100000–40000). When 50000 which is half of the value subtracting the immediate preceding current VD value from the immediate succeeding current VD value is the synchronization target value, the maximum position deviation is 50000, resulting in a difference of 10000 pulses. This means that the transfer position of print sheet 14 can be made to synchronize more quickly by this value of difference. According to the above setting, the range of printing can be increased by shortening the time required to initiate printing and reducing the distance from the leading edge of print sheet 14 to the print start position.

Another method of controlling sheet convey will be described. Since offset in printing will affect the printing quality, the position deviation must be set to not more than 1/10 of a print dot in sheet convey control. However, the position deviation after detection of the leading edge of print sheet 14 becomes at least ½ the total number of clock pulses generated within 1 period of a vertical synchronizing signal at maximum in the above-described position control. This means that position deviation of a print dot is generated in carrying out printing of 1 line in 1 period.

Figure 6:
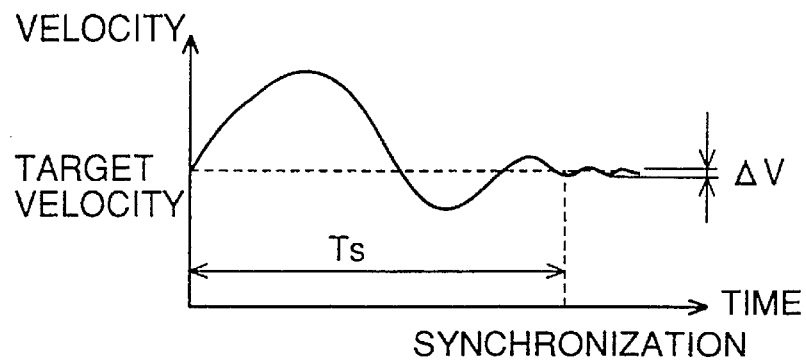
FIGS. 6 and 7 show the relationship between the target velocity and the current velocity when position gains $G_{P2}$ and $G_{P1}$, respectively, are used.

FIG. 6 shows the relationship between the target velocity and the current velocity when a predetermined position gain $G_{P2}$ is used. Since the sum of the position coefficient and the velocity coefficient that can be provided to motor 7 does not change, the velocity error $\Delta V$ after synchronization is reduced as shown in FIG. 6. However, the term Ts required for synchronization is increased.

Figure 7:
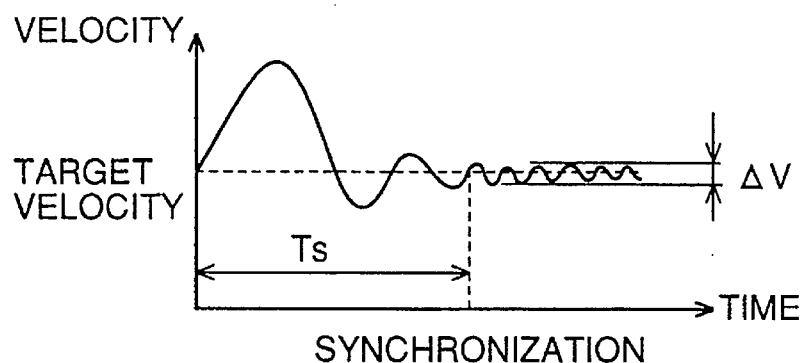

The above tendency is reversed when position gain suitable for position deviation of a print dot is used as the position gain to be multiplied by the position deviation. FIG. 7 shows the relationship between the target velocity and the current velocity when position gain $G_{P2}$ is used. It is appreciated from FIG. 7 that term Ts required for synchronization is reduced, whereas the velocity deviation $\Delta V$ after synchronization is increased. Therefore, the term Ts required for synchronization and velocity deviation $\Delta V$ after synchronization can be reduced by appropriate combination of position gains $G_{P1}$ and $G_{P2}$. More specifically, sheet convey is controlled so that the leading edge of print sheet 14 is detected initially using position gain $G_{P1}$, and then changed to the greater value of position gain $G_{P2}$ after detection of the leading edge of print sheet 14 and when the current position is synchronized with the target position.

Figure 8:
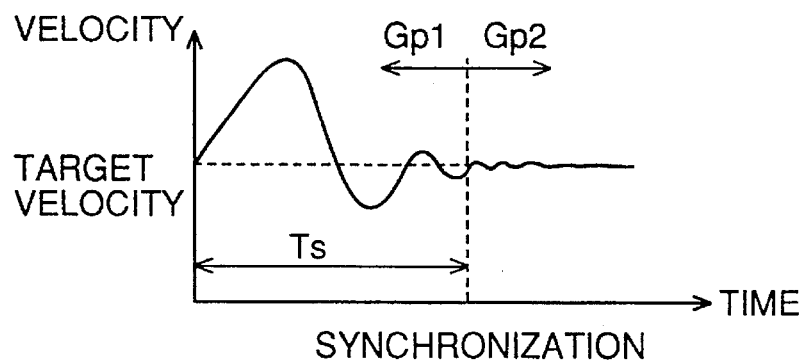
FIG. 8 shows the relationship between the target velocity and the current velocity when both position gains $G_{P1}$ and $G_{P2}$ are used.

FIG. 8 shows the relationship between the target velocity and the current velocity when both position gains $G_{P1}$ and $G_{P2}$ are both used. It is appreciated from FIG. 8 that the term Ts required for synchronization can be reduced by using position gain $G_{P1}$ initially, and then change position gain $G_{P1}$ to $G_{P2}$ after synchronization to reduce the velocity deviation $\Delta V$. Thus, the time required before a print out can be reduced. A printing operation of high quality can be carried out.

Although only the position gain is modified in the above description, the velocity gain solely or both may be modified. Furthermore, a more stable synchronization can be established by setting the position gain on the basis of a value subtracting the target position value from the count value of a clock pulse in response to a sheet edge detection signal.

Figure 9:
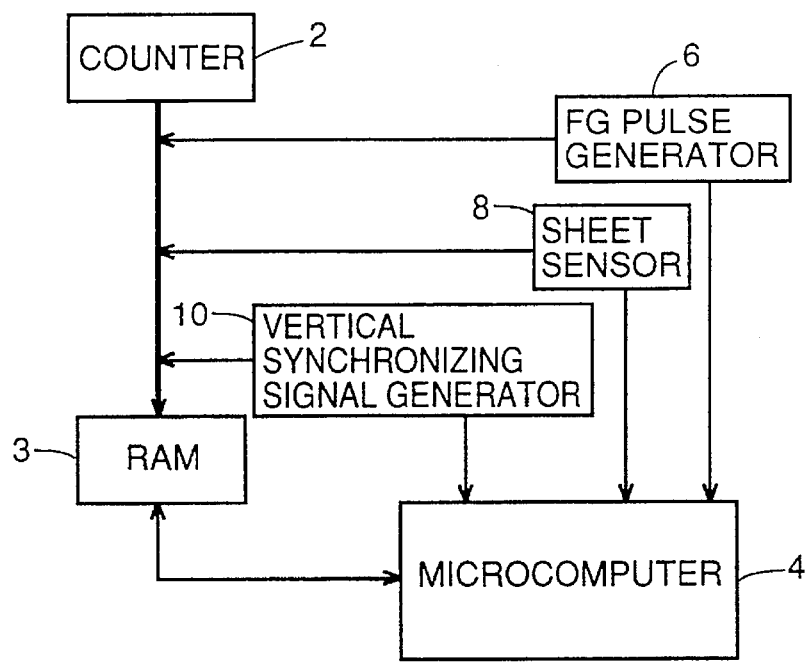
FIGS. 9 and 10 are block diagrams showing the function of one structure and another structure, respectively, of the read out unit of a clock pulse in the image forming apparatus of FIG. 1.

The read out process of a clock pulse will be described in detail hereinafter with reference to the block diagram of FIG. 9 showing a structure of the read out portion of a clock pulse in the image forming apparatus of FIG. 1.

Referring to FIG. 9, an FG pulse generated by FG pulse generator 6, a vertical synchronizing signal generated by vertical synchronizing signal generator 10, and a sheet edge detection signal generated by sheet sensor 8 when the leading edge of print sheet 14 is detected are respectively applied to microcomputer 4, whereby a count value is read out to be stored in RAM 3 from counter 2 individually in response to respective pulses and signals. Microcomputer 4 reads out a count value stored in RAM 3 accordingly which are used for the above-described control operation.

Figure 10:
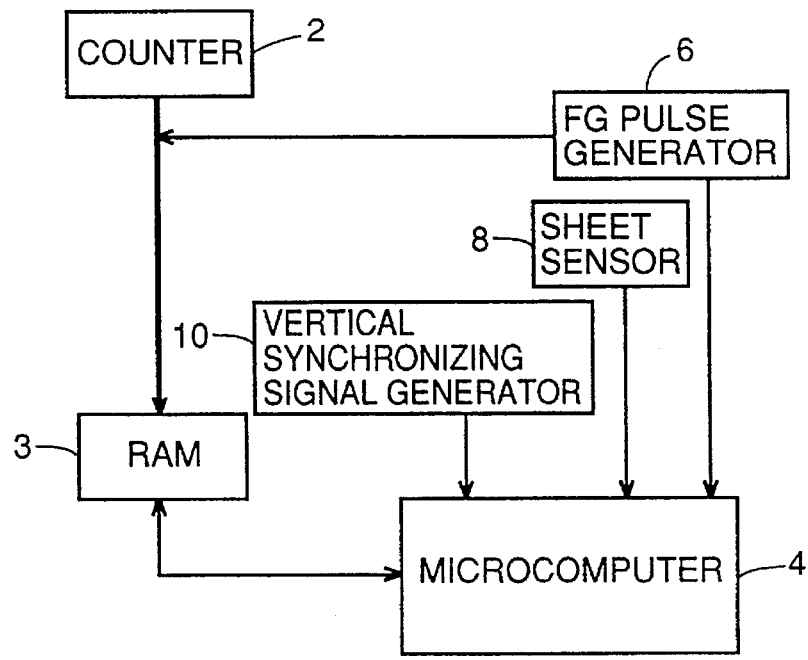
Figure 11:
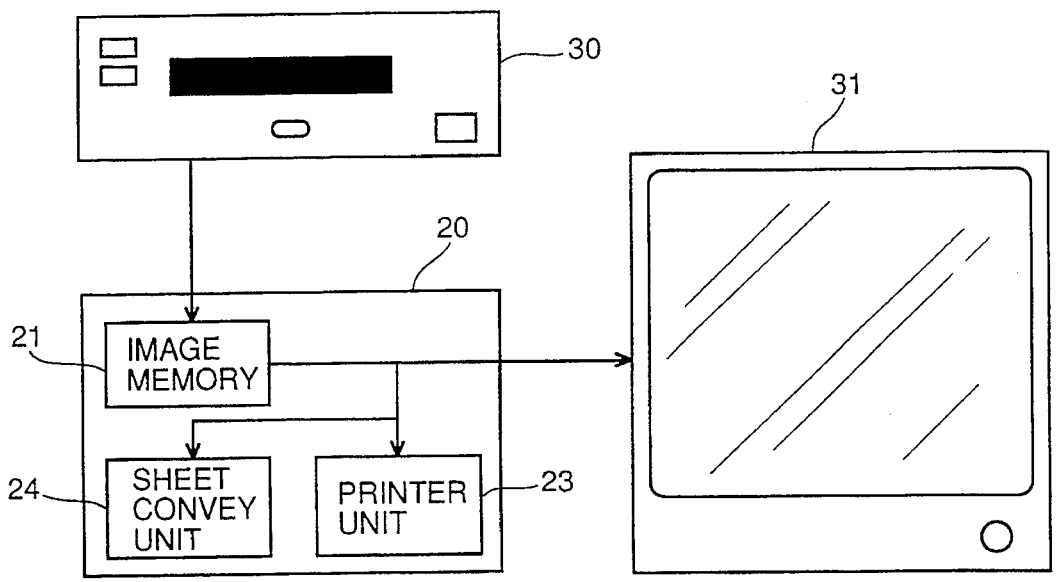
FIGS. 11 and 12 are first and second block diagrams showing structures of a system including a conventional image forming apparatus.
Figure 12:
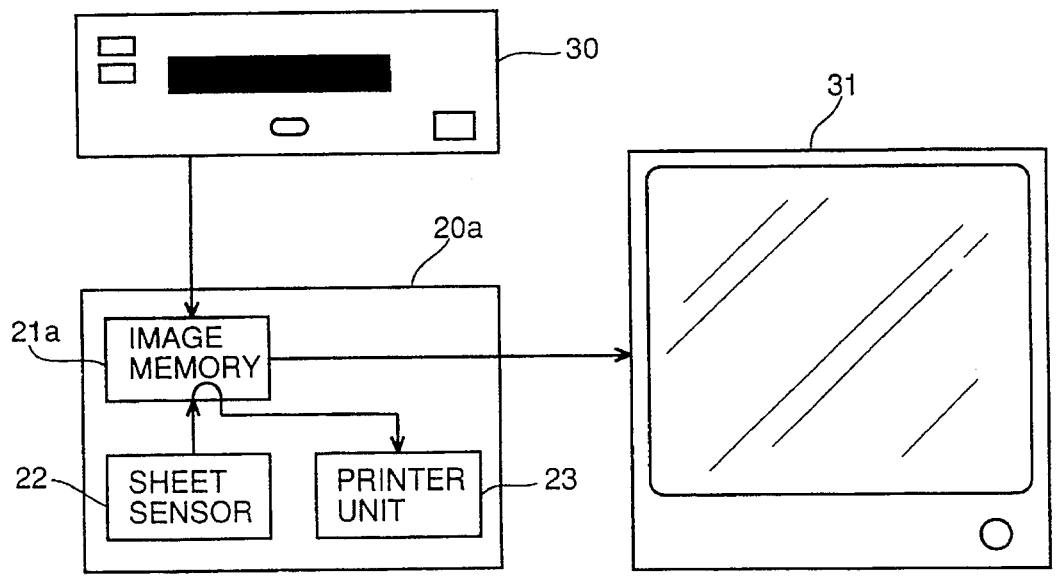
Figure 13:
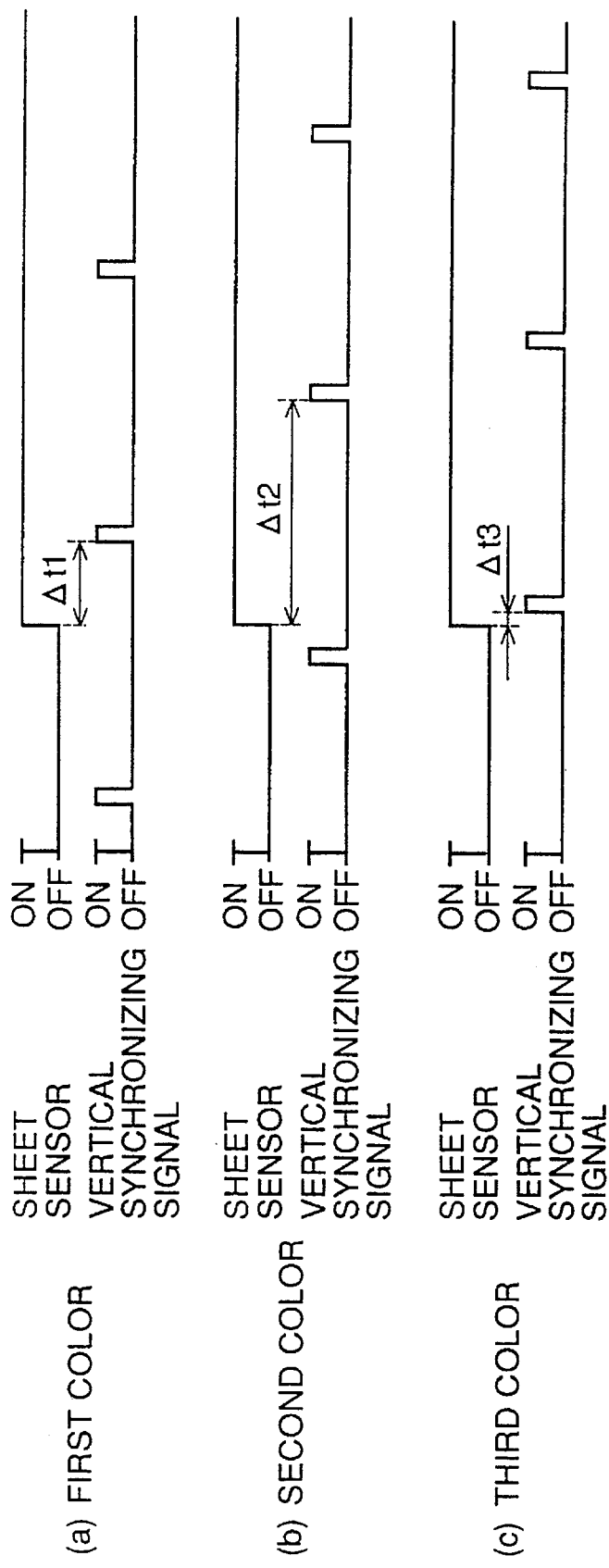
FIG. 13 is a timing chart for describing the problems of a conventional image forming apparatus.

Another structure of the read out portion of a clock pulse will be described with reference to the block diagram of FIG. 10. When a vertical synchronizing signal generated from vertical synchronizing signal generator 10 or a sheet edge detection signal provided from sheet sensor 8 are applied to microcomputer 4, microcomputer 4 reads out the count value stored in RAM 3 from counter 2 according to an FG pulse input right after. The read out count value is used for the control operation. Although there is a possibility of a delay of 1 period of an FG pulse at maximum starting from an input of a vertical synchronizing signal and a sheet edge detection signal up to the read out of a count value from counter 2, the circuit structure is simplified in comparison with the read out portion of a clock pulse shown in FIG. 9. Furthermore, the sheet convey control by microcomputer 4 is simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus responsive to a vertical synchronizing signal to move a print sheet for forming a predetermined image, comprising:

convey means for moving said print sheet;

image forming means for forming said predetermined image on said print sheet while said print sheet is moved by said convey means;

detection means for detecting an edge of said print sheet; and control means for controlling said convey means so that a move position of said print sheet from which said print sheet is to be moved by said convey means during image forming is set to a predetermined position with said vertical synchronizing signal as a reference after an edge of said print sheet is detected by said detection means in moving said print sheet by said convey means.

2. The image forming apparatus according to claim 1, wherein said control means comprises velocity control means for controlling velocity of said convey means so that the velocity of moving said print sheet is set to a predetermined velocity before an edge of said print sheet is detected by said detection means.

3. The image forming apparatus according to claim 2, wherein said velocity control means comprises phase control means for carrying out a phase lock loop control.

4. The image forming apparatus according to claim 1, wherein said control means comprises velocity control means for controlling velocity of said convey means so that the velocity of moving said print sheet is set to a predetermined velocity with said vertical synchronizing signal as a reference after an edge of said print sheet is detected by said detection means.

5. The image forming apparatus according to claim 1, wherein said control means comprises pulse generation means for generating a pulse in synchronization with operation of said convey means, clock pulse generation means for generating a clock pulse which becomes the reference of the operation of said control means, count means for counting said clock pulse, memory means for storing a count value of said count means according to detection of an edge of said print sheet by said detection means, said pulse, and said vertical synchronizing signal, and calculation means for calculating a velocity coefficient and a position coefficient using a count value stored in said memory means to control said convey means using at least one of said velocity coefficient and position coefficient.

6. The image forming apparatus according to claim 5, wherein said calculation means comprises first calculation means for storing as a target position value into said memory means a value having a prestored synchronization target value added to a count value stored in said memory means according to a vertical synchronizing signal input right before an edge of said print sheet is detected by said detection means, second calculation means for storing as a current velocity value into said memory means a value having a count value stored in said memory means according to said pulse of 1 preceding period subtracted from a count value stored in said memory means according to said pulse, third calculation means for storing as said target position value into said memory means a value having a prestored target amount of travel added to said target position value, fourth calculation means for storing as said velocity coefficient into said memory means a value which is a velocity deviation multiplied by a prestored velocity gain said velocity deviation being a prestored target velocity value subtracted from said current velocity value, and fifth calculation means for storing as said position coefficient into said memory means a value which is a position deviation multiplied by a prestored position gain, said position deviation being said current position value subtracted from said target position value calculated by said third calculation means.

7. The image forming apparatus according to claim 1, wherein said control means controls said convey means so that the move position of said print sheet is set to a predetermined position with the timing of an elapse of half a period of said vertical synchronizing signal as a reference.

8. The image forming apparatus according to claim 1, wherein said control means changes control gain so that a deviation between the move position and said predetermined position is reduced before formation of an image by said image forming means such that said deviation becomes lower than a predetermined amount.

9. The image forming apparatus according to claim 1, wherein said control means controls said convey means using a first position gain until the velocity of moving said print sheet is synchronized with a predetermined target velocity, and controls said convey means using a second position gain greater than said first position gain after synchronization.

10. The image forming apparatus according to claim 1, wherein said image forming means divides said predetermined image into a plurality of color components for forming said predetermined image by superimposing images corresponding to each of said plurality of color components, wherein said control means repeats a control operation corresponding to the number of said plurality of color components.

11. The image forming apparatus according to claim 1, wherein said vertical synchronizing signal comprises a signal generated for every one line of said predetermined image, said image forming apparatus forming an image of one line of said predetermined image during one period of said vertical synchronizing signal.

12. The image forming apparatus according to claim 1, wherein said control means comprises pulse generation means for generating a pulse in synchronization with an operation of said convey means, clock pulse generation means for generating a clock pulse which becomes a reference of an operation of said control means, count means for counting said clock pulse, and memory means for storing a count value of said count means according to each of a detection output of said detection means, said pulse, and said vertical synchronizing signal.

13. The image forming apparatus according to claim 1, wherein said control means comprises pulse generation means for generating a pulse in synchronization with an operation of said convey means, clock pulse generation means for generating a clock pulse which becomes a reference of an operation of said control means, count means for counting said clock pulse, and memory means for storing a count value of said count means according to said pulse.

14. A method for conveying a print sheet on which a predetermined image is to be formed comprising the steps of:

detecting an edge of the print sheet; and controlling a conveyor for moving the print sheet so that a move position of the print sheet from which the print sheet is to be moved by said conveyor during the formation of the predetermined image on the print sheet including setting the move position to a predetermined position with reference to a vertical synchronizing signal after said edge has been detected.

15. The method according to claim 14, wherein said controlling step further includes setting a velocity of said conveyor so that a velocity of moving the print sheet to a predetermined velocity before said edge is detected.

16. The method according to claim 14, wherein said controlling step further includes setting a velocity of said conveyor to be a predetermined velocity with reference to said vertical synchronizing signal after said edge is detected.

17. The method according to claim 14, wherein said controlling step further includes:

generating a pulse in synchronization of said conveyor;

generating clock pulses for an operational reference of said controlling step;

counting said clock pulses;

storing a count value from said counting step according to said detecting of said edge, said pulse, and said vertical synchronizing signal;

calculating a velocity coefficient and a position coefficient using said count value; and controlling said conveyor using at least one of said velocity coefficient and said position coefficient.

18. The method according to claim 17, wherein said calculating step includes:

adding a predetermined synchronization, a predetermined target amount of travel, and target value said count value according to a vertical synchronizing signal input right before an edge is detected to form a target position value;

subtracting a count value of a pulse of one preceding period from said count value to form a current velocity value;

subtracting a predetermined target velocity value from said current velocity value to form a velocity deviation;

multiplying said velocity deviation by a predetermined velocity gain to form said velocity coefficient;

subtracting said current position value from said target position value to form a position deviation; and multiplying a predetermined position gain and said position deviation to form said position coefficient.

19. The method according to claim 14, wherein said controlling step further includes reducing, before formation of an image, a deviation between said move position and said predetermined position to be less than a predetermined amount.

20. The method according to claim 14, wherein said controlling step further includes:

controlling said conveyor using a first position gain until a velocity of moving the print sheet is synchronized with a predetermined target velocity; and controlling, after synchronization, said conveyor using a second position gain, said second position gain being greater than said first position gain.

21. The image forming apparatus according to claim 1, wherein said control means includes means for generating, when said detection means detects an edge, a target position value based on a value of said vertical synchronizing signal.

22. The image forming apparatus according to claim 21, wherein said means for generating includes means for adding said value to a synchronization value to form said target position value.

23. The image forming apparatus according to claim 21, wherein said means for generating includes means for adding said value to a synchronization value and to a target amount of value to form said target position value.

24. The image forming apparatus according to claim 23, wherein said means for generating includes means for subtracting a current position value from said target position value to form a position deviation.

25. The image forming apparatus according to claim 24, wherein said means for generating includes means for multiplying said position deviation by a predetermined position gain to form a position coefficient.

26. The image forming apparatus according to claim 25, wherein said means for controlling controls said convey means in accordance with said position coefficient.

* * * * *